United States Patent [19]

Noguchi et al.

[11] 4,147,074
[45] Apr. 3, 1979

[54] ALUMINUM ALLOY ROCKER-ARM

[75] Inventors: Masamitsu Noguchi, Toyota; Yoshiro Komiyama, Okazaki; Masaoki Hashimoto, Aichi, all of Japan

[73] Assignee: Toyota Jidosha Kogyo Kabushiki Kaisha, Toyota, Japan

[21] Appl. No.: 799,688

[22] Filed: May 23, 1977

[30] Foreign Application Priority Data

Feb. 5, 1977 [JP] Japan .................. 52-012021

[51] Int. Cl.$^2$ ........................... G05G 11/00
[52] U.S. Cl. ........................... 74/559; 75/140; 75/142; 123/90.39; 123/90.44; 148/32.5
[58] Field of Search ........... 75/142, 143, 147, 148, 75/140; 148/32, 32.5; 123/90.39, 90.44; 74/559

[56] References Cited

U.S. PATENT DOCUMENTS

| | | | |
|---|---|---|---|
| 2,026,542 | 1/1936 | Kempf et al. | 75/148 |
| 2,075,089 | 3/1937 | Bonsack et al. | 75/148 |

*Primary Examiner*—R. Dean
*Attorney, Agent, or Firm*—Brisebois & Kruger

[57] ABSTRACT

A light weight, strong, and wear resistant rocker-arm of a high strength aluminum alloy with Si 5–25%, Cu less than 6%, Mg less than 1.5%, P 0–0.2% and the balance Al. An element with lubricating properties can be used in the alloy. The cross-section of the rocker-arm is generally T-shaped, or inverted T-shaped.

10 Claims, 3 Drawing Figures

ALUMINUM ALLOY ROCKER-ARM

BACKGROUND OF THE INVENTION

Weight reduction of an internal combustion engine, particularly that of its movable valve system, contributes vastly to improved performance of the engine. Among other parts of the movable valve system, the rocker-arm is required not only to be light-weight but also to have a small valve-equivalent weight (good inertia efficiency) to minimize pad surface wear and pitting. However, the requirements of the rocker-arm include high strength and rigidity of its body, excellent wear resistance and anti-pitting characteristics of its pad surface, and ease of valve clearance adjustment.

Thus, light weight is required. On the other hand, in view of its requirements for strength, wear resistance, anti-pitting characteristics of its pad surface, and ease of valve clearance adjustment, the rocker-arm has been mainly fabricated of a high strength cast iron or a specially treated steel. Some rocker-arms fabricated of aluminum alloy and which can be mentioned, are the rocker-arms for GM's "Electra" automobile with overhead valve (OHV) engine and for BMW's vehicle with overhead cam (OHC) engine.

In the case of GM's "Electra" the engine is an OHV using a hydraulic oil tappet and operated at large capacity and low rpm. Meanwhile, BMW's rocker-arm uses a steel eccentric ring at the valve clearance adjusting part, which is tightened with a steel bolt and nut. In such a construction, adjusting the valve clearance while the engine is running is difficult. In addition, adoption of the steel bolt and nut reduces the advantage of using an aluminum alloy rocker-arm body for the purpose of weight reduction.

In an effort to solve the problem, the present inventors proposed a rocker-arm of conventional form which is fabricated of an ordinary aluminum alloy; the antiwear pad at one end is encasted; and the female thread to receive the adjusting screw at the other end is strengthened with a helical spring type thread insert. As compared with the conventional iron base rocker-arm, the proposed rocker-arm permitted considerable reduction of weight, but left much room to be improved, in performance and cost, etc., because of the necessity for a separate bearing bushing between the rocker-arm and the rocker-shaft.

SUMMARY OF THE INVENTION

A primary object of the present invention is to provide a rocker-arm whose body is fabricated of a light weight aluminum alloy characterized by excellent wear resistance and high strength.

Another object of the present invention is to provide a rocker-arm fabricated of an aluminum alloy with good bearing and lubricating properties.

Still another object of the present invention is to provide a simplified rocker-arm which has a body of a desired form and does not need the conventional separate bearing bushing.

Still another object of the present invention is a very economical rocker-arm of light weight and simplified construction.

DETAILED DESCRIPTION OF THE PREFERRED EMBODIMENTS

Figure 1:
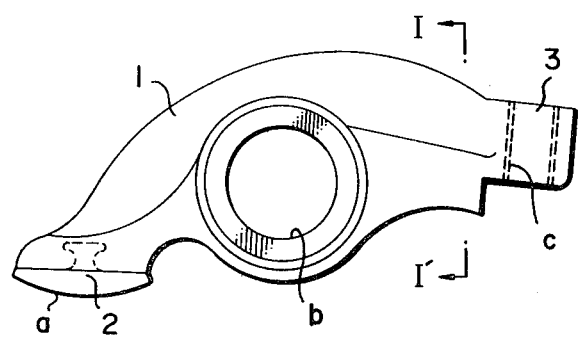
FIG. 1 is a front elevation view of a rocker-arm according to the present invention.
Figure 2:
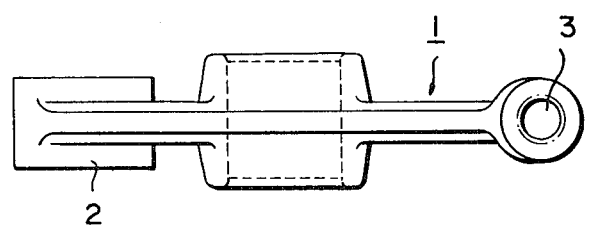
FIG. 2 is a top plan view of the rocker-arm of FIG. 1.
Figure 3:
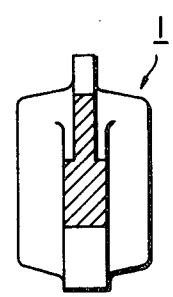
FIG. 3 is a view in section taken along line I-I' of FIG. 1.

The rocker-arm according to the present invention is characterized in that its body is made from a high strength aluminum alloy with, by weight, Si 5–25%, Cu in an amount sufficient to increase the strength of the alloy, but less than 6%, Mg in an amount sufficient to permit hardening by heat treatment, but less than 1.5%, P 0–0.2% and the balance Al. P is usually not required where the alloy contains less than about 14% Si. However, small amounts of P, up to about 0.2%, have a refining action on the Si which permits the use of Si in the range of 14%–25% without significantly reducing the toughness of the alloy. The alloy can include a lubricating ability giving element, such as Pb and/or Sn.

Further, the aluminum alloy rocker-arm according to the present invention is characterized in that at one end of its body is integrally provided a pad made of a wear resistant material and the rocker-arm is a thin wall structure either of T cross-section or inverted T cross-section.

Now the aluminum alloy rocker-arm according to the present invention will be described referring to the drawing.

As indicated in FIG. 1, the aluminum alloy rocker-arm according to the present invention has its body 1 formed from a high strength wear resistant aluminum alloy, has at one end of its body a harder wear resistant pad or insert 2, preferably cast into the aluminum alloy body so it is integral with the body, and has at its other end a bored and threaded adjusting screw hole 3. The threads of hole 3 are directly formed in the aluminum alloy material of the body. Pad 2 can be an insert of a steel alloy, made small to save weight.

One preferred alloy for the rocker-arm body of this invention is a high strength aluminum alloy with Si 5–14%, Cu in an amount sufficient to add strength to the alloy but less than 5%, Mg in an amount sufficient to permit heat strengthening of the alloy but less than 1.5% and the balance Al. Another alloy is Si 14–25%, Cu in an amount sufficient to add strength to the alloy but less than 6%, Mg in an amount sufficient to permit heat strengthening of the alloy but less than 1.5%, P sufficient to refine the large amount of Si but less than 0.2% and the balance Al. Either of these alloys can include a lubricating ability giving element such as Pb, Sn, the amount of Pb being not greater than 2% or Sn not greater than 3%.

In the case of the high strength aluminum alloy with Si 5–14%, Cu less than 5%, Mg less than 1.5% and the balance Al, Si more than 5% is required for castability but the upper limit is 14%, because Si in excess of 14% has been found to reduce the toughness of the material. Cu is effective to increase the strength. However, Cu above 5% is likely to reduce the castability of the alloy and can produce casting defects. Mg is effective to increase the strength through appropriate heat treatment, but too much of it is likely to cause casting defects such as cracks and makes the product brittle. Therefore, Mg is preferably less than 1.5%.

In the case of a high strength aluminum alloy with Si 14–25%, Cu less than 6%, Mg less than 1.5%, P less than 0.2% and the balance Al, with particular emphasis on wear resistance the Si content is over 14%, but if 25% is exceeded, the machinability and castability will heavily deteriorate, making the material brittle. Cu is also effective to increase the strength, but too much of it is likely to reduce the castability and cause casting defects, its desirable content being thus less than 6%. Mg is also effective to improve the strength through heat treatment, but too much of it is likely to cause casting defects such as cracks and promote embrittlement, its desirable content being thus less than 1.5%. P is effective to refine Si which is used in great amount in this alloy as one of its essential elements, but when added in excess of 0.2%, it will not be effective any more.

In the following table, Table I, are compared the characteristics of the invented rocker-arm according to this invention, and the conventional rocker-arm.

TABLE I

| Items | Simple Weight (g/piece) | Valve-Equivalent Weight (g/piece) | Rigidity (Kg/mm) |
|---|---|---|---|
| Conventional product (Steel) | 155~160 | 70.0 | $1.7 \times 10^3$ |
| Tentative product (JIS AC 2B) (Ordinary Al alloy with spring thread insert) | 85~90 | 48.6 | $1.9 \times 10^3$ |
| Invented product No. 1 (3Cu-6Si-0.5Mg-bal. Al) | 50~55 | 37.0 | $1.4 \times 10^3$ |
| Invented product No. 2 (4.5Cu-17Si-0.5Mg-0.1P-bal. Al) | 50~55 | 37.0 | $1.4 \times 10^3$ |
| Invented product No. 3 (No. 1 + 2Pb or 3Sn) | 50~55 | 37.0 | $1.4 \times 10^3$ |
| Invented product No. 4 (No. 2 + 2Pb or 3Sn) | 50~55 | 37.0 | $1.4 \times 10^3$ |

All amounts are in % by weight

The invented rocker-arm with its body fabricated of an aluminum alloy is much lighter in weight than the conventional product of cast iron or steel and because of its reduced valve equivalent weight (inertia efficiency) it improves the engine performance.

Moreover, the inverted rocker-arm with its body fabricated of an aluminum alloy with lubricating properties needs no expensive inserted kermet bearing bushing at the bearing b as in the conventional product. Thus, between the rocker-arm and the rocker shaft the bearing bushing can be omitted. Especially desirable is the above-mentioned aluminum alloy with added Sn, Pb to increase the lubricating properties.

Further, the rocker-arm according to the present invention with its body fabricated of the high strength aluminum alloy of the above composition of this invention has a strong female thread C, thereby rendering the use of a spring insert needless and permitting direct threading of the adjusting screw into the rocker-arm.

Another advantage of the present invention is the ability to select the shape of the rocker-arm body. The sectional profile of the rocker-arm can be simplified from the conventional cross-section I to a T, or an inverted T cross-section. Such simplification of profile results in reduction of weight with the strength of the rocker-arm itself maintained as high as before.

As is evident from the above-the rocker-arm fabricated of a high strength aluminum alloy according to the present invention is of very light weight, yet excels in wear resistance. Moreover, it is economically very advantageous, because the spring insert and bearing bushing, (an additional work step and part) of the conventional rocker-arm can be eliminated. In addition, the simplified profile of the body contributes to further weight reduction without sacrificing the excellence in strength and wear resistance, thus providing an economical, light weight rocker-arm with very high performance.

What is clamed is:

1. A rocker-arm body of a high strength aluminum alloy and comprising, an integrally connected wear resistant material pad at one end of the rocker-arm body; a threaded adjusting screw receiving opening formed in the aluminum alloy at the other end of the body; the sectional profile of the arm being T or inverted T-shaped; said aluminum alloy consisting essentially of by weight Si 5–25%, Cu in an amount sufficient to add strength to the alloy but less than about 6%, Mg in an amount sufficient to permit heat strengthening of the alloy but less than about 1.5%, P 0%–0.2% and the balance Al.

2. A rocker-arm body according to claim 1 wherein said alloy further contains a lubricant property imparting element.

3. A rocker-arm body of a high strength aluminum alloy and comprising, an integrally connected wear resistant material pad at one end of the rocker-arm body; a threaded adjusting screw receiving opening formed in the aluminum alloy at the other end of the body; the sectional profile of the arm being T or inverted T-shaped; said aluminum alloy consisting essentially of by weight Si 5–25%, Cu in an amount sufficient to add strength to the alloy but less than about 6%, Mg in an amount sufficient to permit heat strengthening of the alloy but less than about 1.5%, P 0%–0.2%, less than 5% of a lubricant property imparting element, and the balance Al.

4. A rocker-arm body according to claim 3 wherein the lubricant property imparting element is one or more of the elements selected from the group consisting of Pb and Sn.

5. A rocker-arm body according to claim 4 wherein the lubricant property imparting element is Pb, present in an amount less than about 2% by weight.

6. A rocker-arm body according to claim 4 wherein the lubricant property imparting element is Sn, present in an amount less than about 3% by weight.

7. A rocker-arm body according to claim 1, wherein the aluminum alloy contains, Si 5–14%, Cu less than 5%, Mg less than 1.5% and the balance Al.

8. A rocker-arm body according to claim 1 wherein the aluminum alloy contains Si 14–25%, Cu less than 6%, Mg less than 1.5%, P less than 0.2%, and the balance Al.

9. A rocker-arm body according to claim 3, wherein the aluminum alloy contains, Si 5–14%, Cu less than 5%, Mg less than 1.5% and the balance Al.

10. A rocker-arm body according to claim 3, wherein the aluminum alloy contains Si 14–25%, Cu less than 6%, Mg less than 1.5%, P in an amount sufficient to refine the Si but less than 0.2%, and the balance Al.

* * * * *